Figure 1:
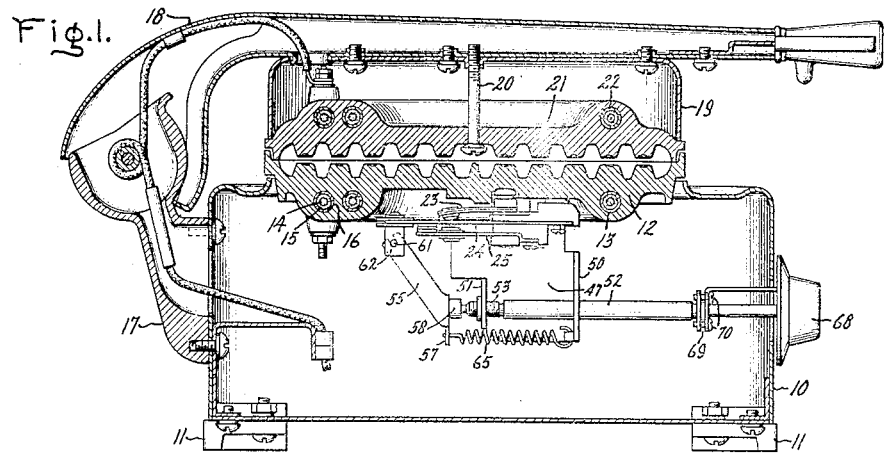

Dec. 23, 1941. R. A. WINBORNE 2,267,387
CONTROL DEVICE
Filed Aug. 3, 1940 2 Sheets-Sheet 1

Inventor:
Russell A. Winborne,
by Harry E. Dunham
His Attorney.

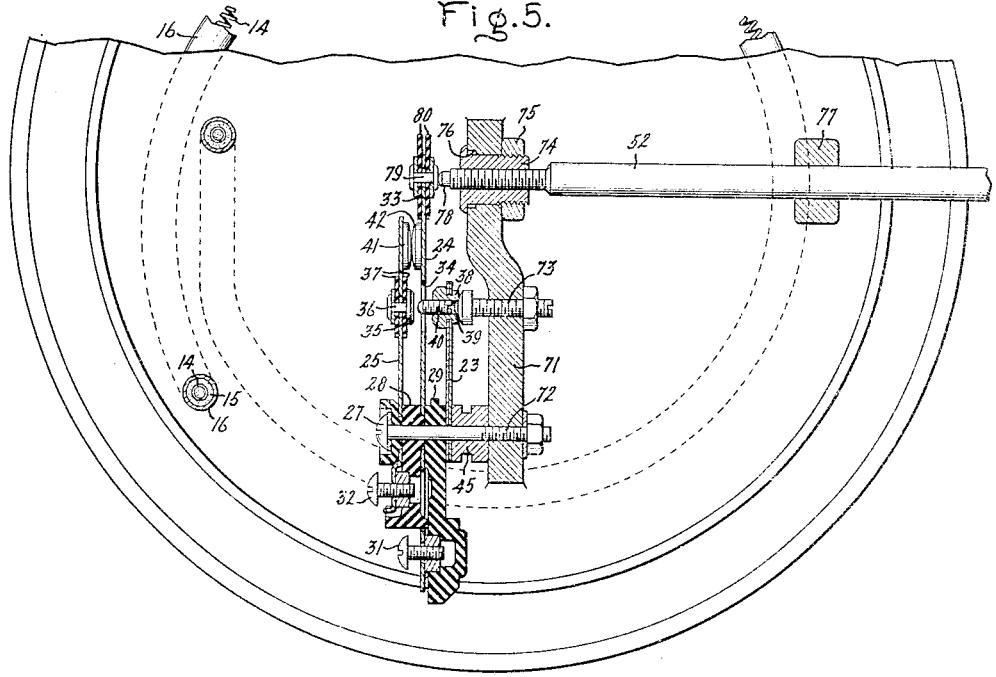

Patented Dec. 23, 1941

2,267,387

UNITED STATES PATENT OFFICE 2,267,387

CONTROL DEVICE

Russell A. Winborne, Oak Park, Ill., assignor to Edison General Electric Appliance Company, Inc., Chicago, Ill., a corporation of New York Application August 3, 1940, Serial No. 350,922

5 Claims. (Cl. 200—139)

This invention relates to a control device and more particularly to a temperature responsive control device for controlling the heating circuit of an electrical appliance in accordance with temperature changes and has for its object the provision of a new and improved control device which is simple in construction, relatively inexpensive to manufacture and can be readily and simply adjusted to maintain a predetermined temperature within a temperature range varying from a manually settable off position to a predetermined maximum temperature.

While this invention will be particularly described with reference to its application to an electrically heated waffle iron, it is to be understood that this is merely an illustration of one of the many applications of my improved control device since it may also be readily used for controlling the temperature of other electrically heated devices, such as an electric sandwich cooker, flat iron and the like.

It is among the primary objects of this invention to provide a new and improved control device of the slow make and break type with simple and relatively inexpensive means for accurately adjusting its temperature setting.

It is a further object of this invention to provide means for adjusting the temperature setting of a control device of the slow make and break type which will accurately maintain its calibration and maintain any particular temperature setting within the predetermined range of the adjustable means.

In accordance with this invention in one form thereof, I have provided a new and improved slow make and break control device which is simple and relatively inexpensive to manufacture and which is constructed and arranged to follow the temperature of the heated medium accurately. This control device comprises a bimetallic temperature responsive element which is arranged in good thermal relation with the heated medium and is adapted upon deflection in accordance with temperature changes of the heated medium to cause movement of a flexible contact arm to control the supply of energy to the heated medium. Included in the control device is a relatively rigid contact arm and in order to vary the temperature setting of the control device I have provided improved means by which the relatively rigid contact arm may be moved closer to or farther away from the temperature responsive member so as to cause the temperature setting of the device to be altered. One limiting position of my improved adjusting means corresponds to a manually settable off position at room or normal temperatures and the other limiting position corresponds to a maximum temperature setting of the control device. One of the salient features of my improved arrangement is that the adjusting means is simple in construction and may be manufactured at low cost yet at the same time is accurate and reliable in operation.

Additional features and advantages of my invention will become apparent as the following description proceeds and the features of novelty which characterize this invention will be set forth in the claims appended to and forming a part of this specification.

Figure 2:
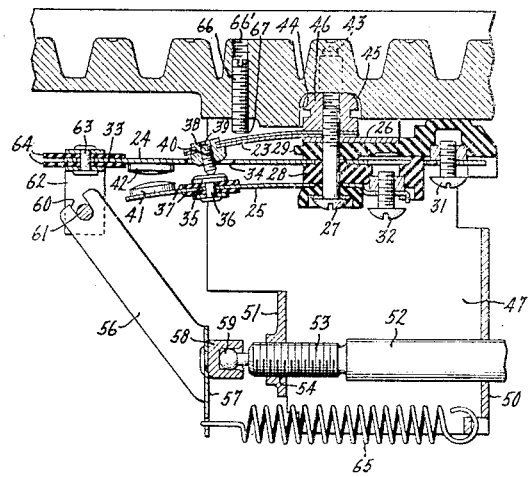
Figure 4:
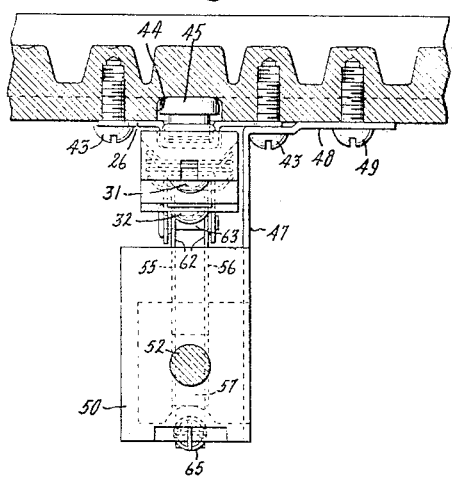
Figure 3:
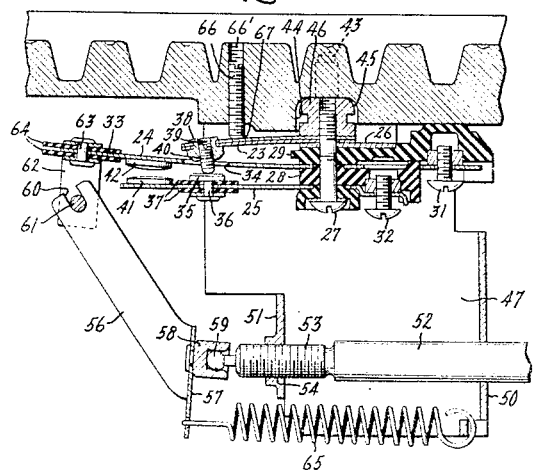

For a more complete understanding of my invention reference should be had to the accompanying drawings in which Fig. 1 is a side elevation partly in section of an electrically heated waffle iron showing my improved control device and temperature adjusting means applied thereto, the control device being shown in the closed circuit position; Fig. 2 is a partial sectional view in elevation showing details of my improved control device and temperature adjusting means therefor, the control device being shown in the open circuit position; Fig. 3 is a view similar to Fig. 2 showing the relative position of the component elements of my improved control device when the adjustable means is moved to the manually settable off position; Fig. 4 is a fragmentary front elevation partly in section showing additional details of my improved control device and temperature adjusting means; Fig. 5 is a partial plan view of the under side of a waffle grid showing in section a modified form of my improved temperature adjusting means, the control device being shown in its on position; Fig. 6 is a sectional view of the modification shown in Fig. 5 showing the control device in its off position; and Fig. 7 is a view similar to Fig. 6 showing the control device in its manually settable off position.

Referring to the drawings and particularly to Fig. 1, I have shown my improved control device as applied to a heavy duty waffle iron having a body portion 10 which is supported by a plurality of feet 11. Supported on the body portion is a lower waffle grid 12 in which is cast a heating element 13. The heating element 13 may be of any suitable type but it is preferred to use a sheathed element of the type described and claimed in Patent 1,367,341 to C. C. Abbott, dated February 1, 1921. As there described the element comprises a coiled resistance element 14 embedded in a compacted mass of heat conducting, electrically insulating material 15, such as magnesium oxide, and enclosed in a suitable metallic sheath 16. These heating elements can be readily bent or otherwise formed into the desired shape.

Mounted on the rear wall of the body 10 is a hinge bracket 17 and hingedly mounted on this hinge bracket is a hinge arm assembly 18 to which is suitably secured a cover 19. Supported in the cover by means of the bolt 20 is an upper grid 21 which is identical to the lower grid 12 and is heated by a heating unit 22 similar to the heating unit 13. It will be understood that the upper and lower grids form the cooking surfaces of the waffle iron and that the heating units 12 and 13 will be connected in series to a suitable source of supply through a suitable cord set (not shown).

With such an electrically heated waffle iron, as with most electrical appliances, it is desirable to have some means for regulating the heating circuit for the heating elements thereof so that the temperature of the medium being heated, in this case the upper and lower waffle grids, may be accurately controlled and the supply of energy to the heating element regulated in accordance with temperature changes. In effecting this result I have provided in accordance with this invention my improved adjustable control device by which the temperature of the waffle grids may be maintained at any predetermined value in a range varying from a manually settable off position at room temperature to a predetermined maximum temperature.

The control device itself is similar to that described and claimed in my copending application Serial No. 343,996, filed July 5, 1940, and assigned to the same assignee as the present invention, and includes as its principal elements a bimetallic temperature responsive element 23, a relatively rigid contact arm 24 and a relatively flexible contact arm 25. As is clearly shown in Figs. 2-5, these three elements are mounted in substantially spaced parallel relation on a metallic supporting bracket 26 and are secured thereto by means of a bolt 27, the relatively rigid contact arm and the relatively flexible contact arm being separated by a spacer block 28 and the bracket 26 and the relatively rigid contact arm being separated by a second spacer block 29. These spacer blocks are made from some suitable electrically insulating material, such as a phenolic condensation product, and in order to insulate the relatively flexible contact arm from the head of the bolt 27, a dished washer of similar insulating material is secured under the head of the bolt. Each of the contact arms 24 and 25 has a portion projecting to the right of the bolt 27 (as viewed in Fig. 2) and these projecting portions are provided with terminal means 31 and 32 to which suitable electrical connections may be made in order to connect the control device in series with the heating elements of the upper and lower waffle grids as is well understood by those skilled in the art.

As previously stated, the contact arms and the bimetallic element are arranged to extend in substantially spaced parallel relation. As shown in Figs. 2 and 3, the relatively rigid contact arm has a portion 33 extending beyond the end of the relatively flexible contact arm and the bimetallic element terminates intermediate the ends of both contact arms. Provided in the relatively rigid contact arms near the end of the bimetallic element is an opening 34 and mounted on the relatively flexible contact arm opposite this opening is an abutment 35 which is secured in position by means of a rivet 36 and is insulated from the arm by means of mica washers 37. Provided in the free end of the bimetallic element is an opening in which is secured by a peening operation a collar 38. This collar is provided with a central threaded opening 39 in which is threaded an adjusting screw 40. The bimetallic element is arranged so that upon an increase in temperature it will deflect downwardly away from the under side of the lower grid 12. Therefore upon movement of the bimetallic element in response to an increase in temperature, the adjusting screw 40 is adapted to move through the opening 34 and engage the abutment 34 so as to force the relatively flexible contact arm away from the relatively rigid contact arm. In order to utilize this movement for controlling the heating circuit of the waffle iron, a suitable contact 41 is provided at the free end of the flexible contact arm 25 which cooperates with a similar contact 42 provided on the relatively rigid contact arm 24. As shown in Fig. 1, the relatively flexible contact arm is constructed so that the contacts 41 and 42 will be biased to a normally closed position.

As shown in Fig. 4, the supporting bracket 26 of the control assembly is adapted to be secured to the under side of the lower waffle grid by means of a pair of bolts 43. In order to assure that the bimetallic element will respond quickly and accurately to changes in temperature of the waffle grid 12, a recess 44 is provided therein to receive the special nut 45 which is threaded on the end of the bolt 27 and is in good metallic contact with the bimetallic element 23. The nut 45 is made of some good heat conducting material, such as brass, and functions to transmit heat by conduction from the waffle grid to the bimetallic element. To facilitate this function, the nut is provided with an enlarged head portion 46 which is maintained in good metallic contact with the lower waffle grid. By means of this construction the bimetallic element will quickly follow the temperature changes of the waffle grid so that a preselected temperature will be accurately maintained. While a large amount of heat will be transmitted to the bimetallic element by conduction through the nut 45, the bimetallic element will, of course, receive additional heat by radiation from the grid, by convection currents, and by conduction through the bracket 26. These will further increase the speed of response of the control device.

With the arrangement thus far described, the control device will function to open the heating circuit of the waffle iron upon the occurrence of a predetermined temperature. In the absence of any further means the temperature at which this circuit opening occurs will depend upon the relative position of the adjusting screw 40. Once the control device is assembled in its operative position in a waffle iron, the adjusting screw 40 is relatively inaccessible so that if no additional means are provided for obtaining a temperature adjustment the waffle iron or other appliance with which the control device is used may be operated only at one temperature. Of course, in most electrical heating appliances it is desirable to have a range of temperatures in which the appliance may be operated and this is particularly true in electrical cooking appliances since in this way the speed and extent of cooking of a particular edible may be readily controlled. In addition it is also desirable to have included in the control device some means for manually turning the device off other than by disconnecting its cord set from a supply receptacle. In accordance with this invention I have provided relatively simple and inexpensive means for obtaining a range of temperature adjustments for a control device of the type described above and the means are so constructed and arranged that one limit of the range of adjustment includes a manually settable off position for the control device at normal or room temperatures. In effecting this result I have provided an improved and simplified means whereby the relatively fixed or rigid contact arm 24 may be moved toward or away from the bimetallic element 23. Since the contact arm 25 is relatively resilient, it will tend to follow the movement of the rigid contact arm thereby altering its position relative to the bimetallic element and thus causing the adjusting screw 40 to engage the abutment 35 earlier or later depending upon the direction in which the relatively rigid contact is moved.

Referring to Figs. 2-4, it will be observed that the improved temperature adjusting means disclosed in this modification of my invention comprises a substantially L-shaped supporting bracket 47 having a portion 48 which is secured to the under side of the lower waffle grid by means of screws 49 and 43. Projecting outwardly from the bracket 47 and integrally formed therewith is a pair of spaced flanges 50 and 51. Journaled in an opening provided in the flange 50 is a horizontally extending shaft 52 having a threaded end 53 which engages a threaded opening 54 provided in the flange 51. By turning the shaft 52 in the opening 54 it is possible to move its extreme left end as viewed in Figs. 2 and 3 horizontally to the left or right.

In order to convert this movement of the shaft into relatively vertical movement of the contact arm 24, there is provided a substantially U-shaped bracket having a pair of upwardly extending arms 55 and 56 and a vertically extending bridging portion 57. Riveted to the bridging portion is a socket 58 which is adapted to receive a ball 59 which is formed on the extreme left end of the shaft 52. Provided at the upper end of each of the arms 55 and 56 of the bracket is a U-shaped notch 60 which is adapted to engage a pin 61 to form a pivotal connection between the bracket and the support for the pin. The pin 61 is fixed in a substantially U-shaped bracket 62 which is secured by means of a rivet 63 to the extension 33 of the contact arm 24, suitable mica washers 64 being provided to insulate the bracket from the contact arm. In order to maintain a good mechanical connection between the ball 59 and the socket 58 there is provided a spring 65 which has one end secured to the flange 50 and its opposite end secured to the lower end of the bridging portion 57. By means of this spring the socket 58 is biased against the ball 59 provided on the end of the shaft 52 so that the motion transmitting bracket accurately follows any change in position of the end of the shaft 52.

Considering the operation of my improved adjusting means, it is apparent that by rotating the shaft 52 inward into the threaded portion of the flange 51 the end of the relatively rigid arm will be forced upwardly. Due to the fact that the relatively flexible contact arm is biased toward the relatively rigid contact arm this will cause movement of both contact arms toward the adjusting screw carried by the bimetallic element and will therefore reduce the amount of free movement of the bimetallic element required to open the contacts carried by the contact arms and thereby lower the temperature setting of the device. Conversely, if the shaft 52 is rotated so that the end thereof is moved to the right as shown in Fig. 2, the relatively rigid contact arm will be moved downwardly and will cause the relatively flexible contact arm to take a similar movement which is away from the bimetallic element thus producing a higher temperature setting of the control device. The maximum temperature setting of the control device is controlled by limiting the movement to the right of the end of the shaft 52. This limits the amount that the relatively rigid contact arm can be moved downwardly away from the free end of the bimetallic element.

In order to provide a manually settable off position as the low temperature limit of the temperature range of adjustment, a threaded opening 66' is provided in the lower waffle grid into which is threaded a set screw 66, the position of which may be adjusted relative to the lower waffle grid. This set screw is provided with a rounded end 67 which is adapted to engage the bimetallic element to limit its upward movement or deflection. Thus the set screw is essentially an adjustable stop and by a proper adjustment of the position of its rounded end it will limit upward movement of the bimetallic element so that after a predetermined movement inward or to the left of the shaft 52, the screw 40 provided in the bimetallic element will engage the abutment 35 to prevent further upward movement of the relatively flexible arm 25 and cause the contact 42 to be moved away from the contact 41 thus manually opening the heating circuit. For all normal ambient temperatures the contacts will remain open until the shaft 52 is rotated in the opposite direction.

The shaft 52 is made sufficiently long so that its extreme right end extends outside of the casing 10. Mounted on the portion of the shaft extending outside of the casing is a knob 68 which will be provided with suitable indicia (not shown) which cooperate with a scale marking on the casing to indicate the temperature setting of the control device. In order to adjust the position of the knob 68 in accordance with the actual calibration of the control device, there is provided an adjustable drive connection 69 between the knob 68 and the shaft 52. When the control device has been calibrated, this drive connection is secured to the shaft by means of the screws 70 so that the indicia on the control knob will accurately signify the temperature setting of the control device.

In operation of this form of my improved control device and adjusting means therefor, it will be assumed that the waffle iron is in the cold condition and that it is connected to some suitable source of supply. It is further assumed that the knob 68 has been adjusted in accordance with the predetermined temperature to be maintained. Under these conditions, the upper and lower grids will start to heat and this heat will be quickly transmitted to the bimetallic element through the bracket 26 and the conducting button 46. When the lower waffle grid has attained the predetermined temperature for which the control means has been set, the bimetallic element will have deflected downwardly, as shown in Fig. 2, so that the adjusting screw 40 engages the abutment 35 and causes the relatively flexible contact arm to be moved downwardly to open the contacts 41 and 42 and thereby the heating circuit. The waffle grids will then start to cool and after a predetermined amount of cooling the bimetallic element will have deflected upwardly an amount sufficient to permit the relatively flexible contact arm to move toward the relatively rigid contact arm an amount sufficient to cause a reclosing of the contacts and hence of the heating circuit. As long as the temperature is sufficient for the desired cooking operation, the control device will cycle between its on and off positions and will thereby maintain the selected temperature of the waffle iron. If it is found that more heat or less heat is required, the shaft 52 may be adjusted by means of the control knob 68 so that the distance between the end of the bimetallic element and the abutment carried by the relatively flexible contact is either increased or decreased as the case may be. If the distance is decreased a predetermined lower temperature will be maintained and if the distance is increased a higher temperature will be maintained as previously described.

If it is desired to open the heating circuit completely and positively without disconnecting the waffle iron from its source of supply, it is only necessary to rotate the adjustable shaft inwardly to its extreme position. By thus rotating the shaft, the end 59 thereof will be moved to the left a maximum amount which movement will cause an upward movement of the contact arm 24. In the first stages of this movement the contact arm 25 tends to follow the arm 24. However, after a predetermined movement the bimetallic element will engage the adjustable set screw 66 so that further movement thereof in response to change in position of the shaft 52 is prevented. Under these circumstances upon the further movement of the shaft the bimetallic element will remain stationary and the screw 40 will engage the abutment 35 so as to prevent the contact arm 25 from following the contact arm 24 upwardly. Thus upon a still further movement inwardly of the shaft the contact arm 24 is moved away from the contact arm 25 an amount sufficient to cause opening of the contacts 42 and 41.

In Figs. 5–7 I have shown a modified and still more simplified arrangement for adjusting the temperature setting of my improved control device. In so far as the control device itself is concerned, there is no difference between the arrangement shown in Figs. 1–4 and that shown in Fig. 5 except in the manner in which the control device is mounted. Therefore, similar numerals will be employed to identify like parts. In the arrangement shown in Figs. 5–7 instead of using a single bracket by which the control device may be mounted as a unit on the lower grid of the waffle iron, there is molded on the waffle iron a vertically depending bracket 71 which is provided with an opening for receiving a bolt 72 for securing the component elements of the control device thereto. Also provided in the bracket 71 intermediate its ends is a second aperture through which extends the adjustable bolt 73 which serves the function of the set screw 66 in the arrangement shown in Figs. 1–4.

With the control device mounted vertically, as shown in Figs. 5–7, instead of horizontally, as shown in Figs. 1–4, it is possible to provide a direct connection between the horizontal temperature adjusting shaft 52 and the extension 33 of the contact arm 24. As shown in Figs. 5–7 the shaft 52 is threaded into a sleeve 74 which is secured by means of a nut 75 in an opening 76 provided in the bracket. In order to provide a bearing in the outer end of the adjusting screw, a boss 77 having an opening in which the shaft can be journaled is molded to the lower waffle grid.

The end of the shaft 52 is rounded at 78 and secured to the end of the extension 33 of arm 24 by means of a rivet 79 and insulated therefrom by means of mica washers 80 is an abutment which the end 78 is adapted to engage. By rotating the shaft 52 so that the rounded end is moved to the left as shown in Fig. 5, the relatively flexible and rigid contact arms will be moved away from the bimetallic element 23 and the temperature setting of the control device increased. Conversely by rotating the shaft 52 in the opposite direction so that the end 77 thereof is moved to the right as shown in Figs. 5–7, the contact arms are moved in a direction to decrease the temperature setting of the control device due to the fact that the resilience of both contact arms biases the arm 24 against the end of the shaft 52 at all times.

The operation of the modification shown in Figs. 5–7 is substantially the same as that shown in Figs. 1–4, the range of temperatures being from a predetermined maximum temperature to the manually settable off position shown in Fig. 7.

From the foregoing it is apparent that I have provided a new and improved control device of the slow make and break type for use on a waffle iron or similar electrical appliance and I have provided such a control device with simplified and improved means by which its temperature setting may be readily and accurately varied over a range extending from a manually settable off position to a predetermined maximum temperature setting.

While I have shown particular modifications of my improved temperature adjusting means for a control device, it is clear that other modifications or uses of my improved means may occur to those skilled in the art and I, therefore, intend to cover in the appended claims all modifications that are within the true spirit and scope of this invention.

What I claim as new and desire to secure by Letters Patent of the United States is:

1. A control device having a relatively rigid contact arm having one end fixed and its opposite end free to move, a relatively flexible contact arm arranged in parallel spaced relation with one side of said rigid contact arm and biased toward said arm so as to follow its movement, cooperating contact means mounted on said arms and having a normally closed position, a bimetallic temperature responsive element mounted in parallel spaced relation with the opposite side of said relatively rigid contact arm, means on said bimetallic element adapted to engage said relatively flexible contact arm to cause movement thereof in accordance with temperature changes, adjustable means for moving said relatively rigid contact arm so that said relatively flexible contact arm may be moved closer to or farther away from said means mounted on said bimetallic element, and an adjustable stop for engaging said bimetallic element to limit the movement of said bimetallic element in the cooling direction so that after a predetermined movement of said last mentioned adjustable means said means on said bimetallic element engages said relatively flexible contact arm to permit the relatively rigid contact arm to be moved away therefrom to produce an off position for said control device.

2. An arrangement for varying the temperature setting of a control device having a relatively rigid contact arm fixed at one end and free to move at its opposite end, comprising a shaft having an end adapted to be moved relative to said arm, a bracket for transmitting said movement of said shaft to said arm, means forming a universal connection between one end of said bracket and said end of said shaft, and means forming a pivotal connection between the opposite end of said bracket and said contact arm so that movement of said end of said shaft will cause a deflection of the free end of said rigid contact arm to vary the temperature setting of said control device.

3. An arrangement for adjusting the temperature setting of a control device having a bimetallic temperature responsive element, a relatively rigid contact arm and a relatively flexible contact arm arranged in parallel spaced relation so that said flexible contact arm is moved by said bimetallic element to perform a circuit controlling function in accordance with temperature changes, comprising, a supporting bracket, a shaft threadedly mounted in said bracket, a second bracket having a pair of upwardly extending arms connected by a bridging portion, means for pivotally mounting the upper ends of said arms on said relatively rigid contact arm, and means forming a universal connection between said bridging portion and the end of said shaft so that upon rotary movement of said shaft a substantially vertical movement of said relatively rigid contact arm is produced and the temperature setting of the control device is altered.

4. An arrangement for adjusting the temperature setting of a control device having a bimetallic temperature responsive element, a relatively rigid contact arm and a relatively flexible contact arm arranged in parallel spaced relation so that said flexible contact arm is moved by said bimetallic element to perform a circuit controlling function in accordance with temperature changes; comprising, an L-shaped supporting bracket having a pair of spaced flanges, a shaft threadedly mounted in one of said flanges and rotatably journaled in said other flange, a second bracket having a pair of upwardly extending arms connected at their lower ends by a bridging portion, means for pivotally mounting said arms on said relatively rigid contact arm, ball and socket means for mechanically connecting said bridging portion and one end of said shaft so that rotary movement of said shaft causes a substantially vertical movement of said relatively rigid contact arm and thereby varies the temperature setting of the control device.

5. In an arrangement for adjusting the temperature setting of a temperature responsive control device, a support having a pair of spaced flanges, a shaft rotatably supported in one of said flanges and threadedly engaging said other flange so that rotation of said shaft causes translation of the shaft inwardly or outwardly relative to said support, a bracket bearing against the end of said shaft so as to be moved in accordance with said translation of said shaft, and resilient means extending between said bracket and said support for biasing said bracket against said shaft so that said bracket accurately follows said translation of said shaft.

RUSSELL A. WINBORNE.